Nov. 13, 1962 — A. I. MIHALAKIS ETAL — 3,063,339
PROJECTION SCREENS
Original Filed Aug. 3, 1953 — 2 Sheets-Sheet 1

INVENTORS
John L. Curtin
Agis I. Mihalakis
James L. Read
by Roberts, Cushman & Grover
ATT'YS.

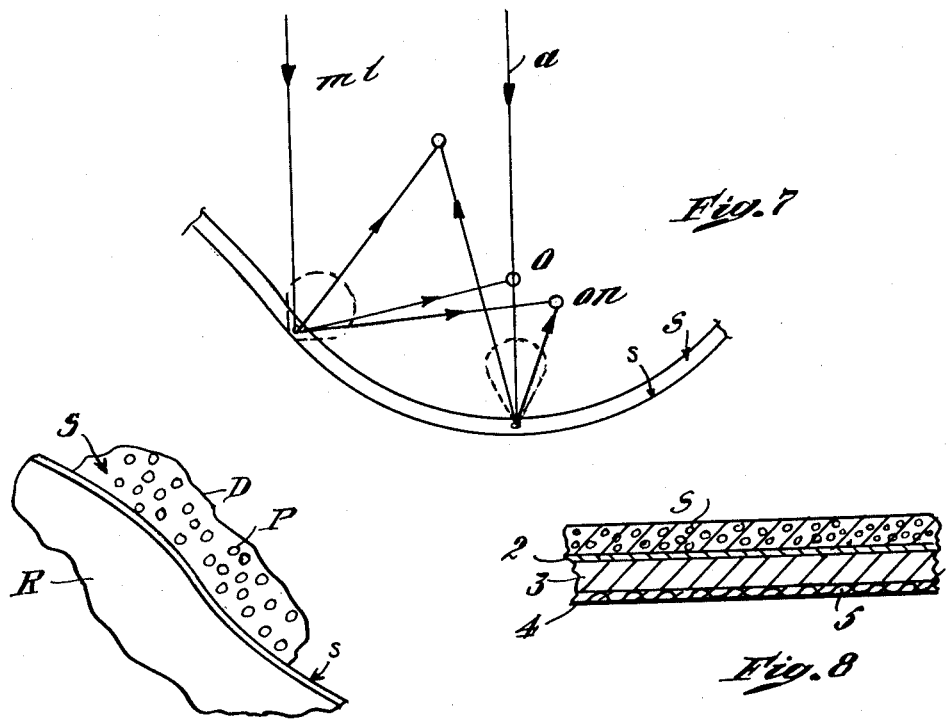
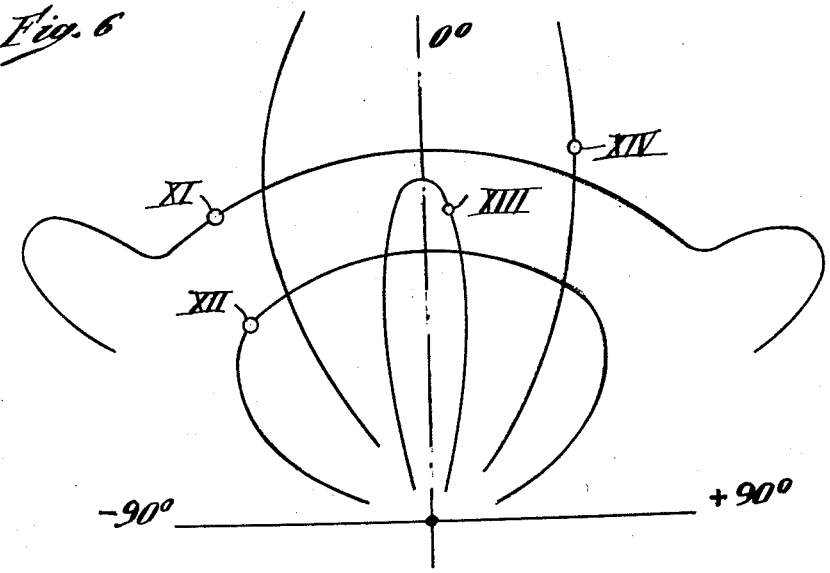

United States Patent Office

3,063,339
Patented Nov. 13, 1962

3,063,339
PROJECTION SCREENS
Agis I. Mihalakis, Canoga Park, Calif., James L. Read, Eggertsville, N.Y., and John L. Curtin, St. Paul, Minn., assignors, by mesne assignments, to William J. Snyder, South Lancaster, Mass.
Continuation of application Ser. No. 371,822, Aug. 3, 1953. This application June 18, 1958, Ser. No. 744,310
(Filed under Rule 47(a) and 35 U.S.C. 116)
11 Claims. (Cl. 88—28.9)

The present invention relates to optical screens of the type suitable to receive an image formed by projection apparatus and to present the image to observers. This is a continuation of application Serial No. 371,822, filed August 3, 1953, now abandoned.

Copending application of Agis I. Mihalakis, one of the inventors herein, Serial No. 257,691, filed November 23, 1951, now Patent No. 2,804,801 of September 3, 1957, and divisional application thereof Serial No. 683,437, filed Aug. 27, 1957, now Patent No. 2,984,152 of May 16, 1961, discloses and claims a screen of the above type which has particularly favorable brilliance and field properties, some of its principal novel features being a definitely controllable field of observation, uniform distribution of the light intensity relayed from projection apparatus to this field of observation, maximum efficiency because of the definite separation of the field of observation from the environmental field and because of minimum absorption of light energy at the screen, and favorable rejection of light impinging on the screen from without the field of observation so that, at any point of the field of observation, such external light is effective essentially only at intensities which are at such points lower than those purposely directed thereto.

The present invention is a further development of the system according to the above copending application, and some of its objects are to provide a screen of this general type which permits, by means of a minimum number of basic optical patterns of maximum efficiency, extensive adjustment and regulation of the field of illumination by comparatively inexpensive and easily controlled and regulated expedients. Other objects are to provide improved screen structures of maximum optical efficiency and mechanical strength.

In one of its principal aspects, the invention provides a system of controlling and predetermining the field properties of a projection screen by the controlled formation from a master-pattern of a non-absorptive, optically smooth and continuously curved composite imaging surface, which field control system is adapted to include, in addition to the shaping of the optical imaging surface, additional control by way of predeterminable, essentially non-absorptive scattering of beams carrying image patterns received and formed or relayed by the non-absorptive imaging surface.

In another optical aspect of the invention, an optical screen comprises reflective or refractive image forming elements of minimum absorption and maximum continuity, which elements are continuously joined at aperture defining contours. These contours or apertures and the imaging powers of the elements together define the vertical and lateral field angles of a field of projection or observation. This screen can be used independently or in combination with essentially transparent or translucent scattering elements which for the purpose of adjustment of field properties, are superimposed on or jutaposed to the image forming elements.

In an especially useful embodiment, the scattering elements are embedded in a thin, transparent layer of essentially uniform thickness which is applied to a metal mirror of maximum continuity and smoothness, and hence maximum reflection but minimum absorption of light energy.

These and other objects and aspects of the invention will appear, from the herein presented outline of its principles, its mode of operation and its practical possibilities together with a description of several typical embodiments illustrating its novel characteristics. These refer to drawings in which FIG. 1 is a schematical fragmentary section through a screen according to the invention;

FIGS. 2 to 5 are diagrams depicting the configuration of imaging surfaces according to the invention;

FIG. 6 indicates the scatter elements on an imaging surface according to the invention;

FIG. 7 is a diagram illustrating the image modifying effect of a scatter component according to FIG. 6;

FIG. 8 is a schematic section through a practical reflecting screen structure according to the invention; and FIG. 9 is a comparative diagram of screen performances.

Figure 1:
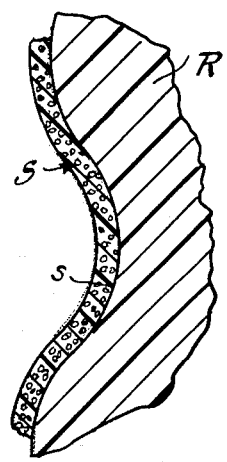

Generally speaking, screens according to the present invention are composed, as indicated in FIG. 1, of an imaging sheet R and a scattering layer S. The imaging sheet has an optical surface $s$ which can be part of a refracting lens structure, or constitute or support a reflecting surface.

In order fully to describe the construction and operation of the optical screen according to the present invention, it is necessary to relate the cooperative functions of the imaging and scattering components thereof. Although an example of the imaging component is disclosed in the above mentioned copending application, such structures will be shortly described herein with particular attention to their contribution within the present invention and to embodiments especially suitable for that purpose and also independently.

*The Imaging Component*

The optical function of this component depends mainly on its field properties and on its resolution, as required by its intended use.

The field properties are determined by the stops of the imaging elements. The entrance pupil of an imaging system is defined as the image of the aperture stop in the object space while the exit pupil is the image of the aperture stop in image space. Since the principal embodiment herein disclosed employs a reflector system we shall consider a mirror in which the mirror margin is the aperture stop which then also becomes the entrance and exit pupil of the system.

The configuration of the field of observation depends on the use of the screen. For example, if a screen is designed for use in an educational audio-visual program, a lateral viewing angle of approximately 90° is preferred since the screen can then be positioned in a front corner of the room and cover all the students without any rearrangement of seats. The vertical viewing angle is selected with regard to the particular height of the screen whose field must include all students when seated. Also, the vertical field should be restricted in size so far as possible in order to conserve energy.

A screen according to invention, designed for such an observation field, is not perceptibly affected by illumination from the side windows or ceiling lights.

As a basis for determining the resolution it is safe to assume that the eye can just resolve two objects separated by an angle of 70 seconds. Using this information about the configuration of a given field of observation, together with the fact that no person should sit closer to the image than twice the width of the screen, the maximum elementary diameter of each imaging element can be computed.

The element size and field configuration having been determined, the optimum configurations of the screen elements can now be computed. While a certain choice is available in this respect, there is an optimum surface which meets all the requirements of good design for a given field of observation. Theoretically, either convex or concave elements of properly selected configuration can be used. A field of observation with different horizontal and vertical field angles can be provided by appropriately dimensioning, either or both, diameter and curvature of the elements. However, for several reasons, all convex or all concave elements do not provide optimum effectiveness. Considering the manufacturing aspects, it is practically almost impossible to provide good polish in the vicinity of the mirror stops. This leads to energy absorbing areas and to areas of non-image forming reflection which make such a screen undesirable for general use. "Hots spots" form mainly where concave or convex elements are adjacent with theoretically sharp edges on the boundaries. Actually, flat surfaces at these regions can not be avoided so that a screen of such design operates at these regions like a plane mirror at least for certain viewing angles. Energy absorbing "dead spaces" appear at theoretically sharp concave edges, and wherever dirt can accumulate. Both types of deficiency are practically unavoidable if a reflecting surface is applied by processes which inherently can not avoid non-uniform metal distribution, such as spraying.

The above copending application provides a screen configuration without any of these defects. By way of example, two specific screens of this type will now be described which are found especially useful for purposes of the present invention.

The first example is designed for a lateral angle of 107.2° and a vertical angle of 82°, and is that described in the above copending application. The second example is designed for lateral and vertical angles of 100° and 50° respectively. Regarding resolving power and hence element size, both patterns are based on the dimensions of a commercially available screen which is 40 inches wide, and on the above mentioned practice that the closest distance from the screen is, according to accepted practice, about twice its width.

Figure 2:
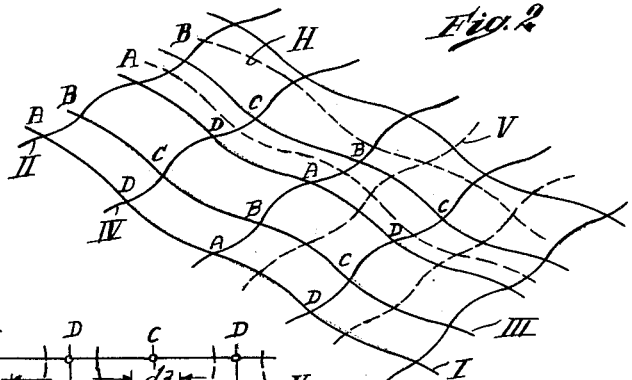

The topographical map of FIGURE 2 illustrates the flow pattern of a screen of this type. The solid lines marked A, B, C, D, of this figure denote the sections or curvatures which occur when progressing in any direction. The dotted lines H and V indicate the horizontal and vertical aperture stops respectively for the various elements, shown separately and similarly indicated in FIG. 3. It will be further noted that the elements alternate in curvature along lines such as A—D—A, B—C—D, so that a convex, concave pattern is maintained throughout. The curvatures at right angles to these lines such as those indicated at A—B—A, C—D—C determined the horizontal field and are all concave in nature while the adjacent row of elements in a horizontal direction are all convex. These curvature lines are marked I, II, III, IV. As a result of these curvatures, the vertical field of observation is maintained by alternating convex and concave elements. The horizontal field is composed of vertical rows of concave elements adjacent on either side to vertical rows of convex elements.

Figure 3:
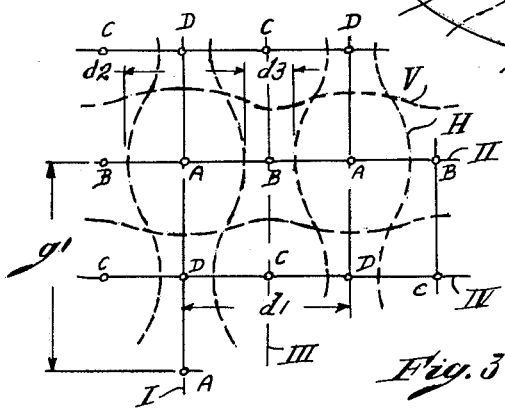
Figure 4:
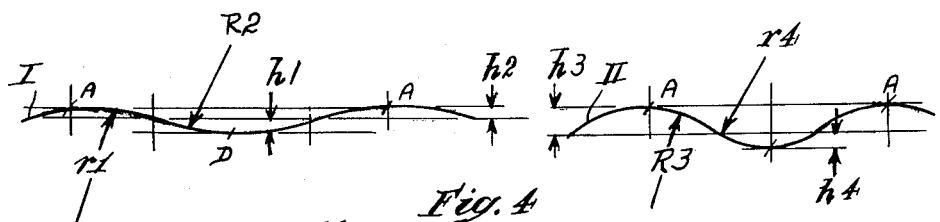
Figure 5:
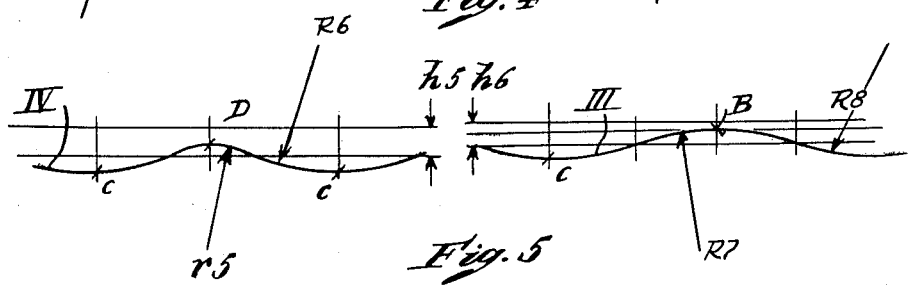

FIGS. 4 and 5 indicate the various surface levels with reference to the legends of FIGS. 2 and 3. The sagitta of the curves are selected to leave no part of the surface, so to speak, undesigned or having even residual hot spots or dead spaces of the above discussed detrimental nature. The depth of a curve in one direction is adjusted to meet the depth of the curve running at right angles to it and at the same time retain the field of view desired. Thus the figure shows reference levels corresponding to the elevation levels of the various elements.

By means of conventional method it is possible to compute the radii of curvatures, the elements diameter and the sagittae giving an angle of observation in one direction which is compatible with the corresponding data of a different angle of observation at right angles to the first, the two angles together determining the field of observation.

The specific dimensions for the two embodiments are given in the table below which refer to the corresponding symbols of the various values indicated in FIGS. 4 and 5.

In this table, the dimensions marked I are those of the first mentioned screen which is also described in the above mentioned application, whereas those marked II refer to an additional embodiment, all dimensions being in inches.

| Dimension | Screen | |
| --- | --- | --- |
|  | I | II |
| r1 | 0.055 | 0.047 |
| r2 | 0.030 | 0.047 |
| r3 |  | 0.013 |
| r4 |  | 0.009 |
| r5 |  | 0.009 |
| r6 |  | 0.018 |
| r7 |  | 0.047 |
| r8 |  | 0.047 |
| d1 | 0.120 | 0.025 |
| d2 | 0.077 | 0.0166 |
| d3 | 0.043 | 0.0083 |
| h1 | 0.015 | 0.0012 |
| h2 | 0.010 | 0.0012 |
| h3 |  | 0.002 |
| h4 |  | 0.001 |
| h5 |  | 0.0033 |
| h6 |  | 0.0042 |
| g1 | 0.275 | 0.0416 |

The above described imaging screen is in all essentials, although not as to now preferred dimensional details, similar to one dealt with in Patent No. 2,804,801 of Sept. 3, 1957.

*The Scattering Component*

As mentioned above, the present invention involves the combination of the above described imaging component with a scattering component which will now be described.

Generally speaking, the scattering component has the function of controlled spreading the field of observation without appreciably impairing the uniformity of energy distribution within that field or the efficiency of energy transmission between projector and observer. It affects the image formation in a manner which while it detracts from the optical properties of the elementary images in the conventional sense, nevertheless improves these properties for purposes of the invention. The general construction of the combined imaging and diffusing components will first be explained with reference to FIG. 6.

FIG. 6 indicates an elementary surface $s$, which may pertain to a refractive or reflective system. Assuming by way of example a reflective system, $s$ is a highly reflective metal surface supported on a base structure which will be described in detail below. The scattering effect according to the invention can be accomplished by way of a separate structural component, or by means of a special surface treatment. In either case, a coating D is applied to the reflecting surface $s$. This coating is preferably of uniform thickness and carries scattering elements P of an order of magnitude slightly larger than the longest wave length of the spectral range to be handled, in most cases the entire visible range. Either superficial or imbedded elements can be used but an embodiment with imbedded scatterers will first be described.

FIG. 6 indicates scattering particles P imbedded in the carrier coating D. Both carrier D and particles P are dielectric and examples of appropriate materials will be given hereinbelow. As well known, particles of this type which are somewhat greater than one wave length display phenomena which result in a somewhat spread reflection of the incident light. However, the particle size is in the present instance so selected that the spreading is rather restricted and so called Rayleigh scattering does not come into consideration.

The diffusion layer thickness should be of the order of magnitude of about ten times the size of the scattering particles and its material should be as transparent as possible. The size of the scattering particles P should be of the general order of magnitude of about a thousand to two thousand millimicrons, or generally speaking somewhat larger than the longest wave length of the light to be handled. The outer surface of the layer S should follow the outline of the reflecting surface s, in other words the two surfaces of the coating S should be parallel, with no filling in of concave elements or diminishing of thickness at convex elements. The density and distribution of the diffusing particles of layer S should be such that transparency is essentially preserved so as not to impair the reflective effect of the surface s. About 5% by weight of scatter material to carrier material, of the types described below, was found to be satisfactory.

It will now be evident that the dimensions of the scattering elements are of an order of magnitude which is essentially lower than that of the image forming elements.

In this manner, the predetermined field properties of purely imaging reflecting or refracting non-diffusing screen of the type described with reference to FIGS. 2 to 5 can be changed at will by adjusting the scattering structure incorporated in layer S, although the exact change cannot always be theoretically predicted and depends a good deal on laboratory experimentation which, however, is fairly simple and does not appreciably add to the cost of the screen and the reliability of the predicted performance. However, the practical performance agrees generally speaking with the theory of this device, as herein indicated. Practically uniform energy distribution over the field of observation, with an energy distribution (screen brightness) inversely proportionate to the field area is obtained, which indicates that the scattering component absorbs very little energy and thus does not detract from the highly efficient performance of the imaging component with its practically non-absorbtive, uninterrupted surface.

Combined Effect

FIG. 7 indicates the combined effect of imaging and scattering components. The field widening effect of the scattering elements is probably due to the fact that the scattering pattern of pencils at points near the aperture margin of the reflecting elements will be unsymmetrical, whereas it becomes more and more symmetrical towards the center and is essentially symmetrical with regard to ray a. Consequently, an image spread results, as indicated in FIG. 7 where $Om$ and $On$ are the scatter images for the marginal pencil $ml$, whereas O is the corresponding unscattered image.

Whatever the theoretical basis may be, the scattering component does not affect the uniformity of brilliance within a certain field, although it produces a zone of more or less diffused light around the theoretical field for the undiffused reflector. For example, for a 40° lateral field from the normal of the uncoated reflector, the diffusion layer will provide unimpaired brilliance over a field from the normal of about 30° with fairly uniform intensity distribution, but the intensity falls gradually off to eventually zero at 90° off the normal, with a total field of about 80° very well usable for average purposes. This effect is illustrated in FIG. 9, wherein curves XI and XII illustrate the effect of scatter coatings to be described in detail hereinbelow.

Instead of imbedding scattering particles within a coating, a similar effect can be obtained by applying to an image forming surface a practically transparent layer whose outer surface is modified to provide scattering but essentially non-absorbing irregularities. It was found possible to apply such a coat which has slight surface irregularities of a configuration, size and distribution which produces the above outlined scattering effect without detriment to the primary imaging function of the elementary mirrors or lenses. Similar to the scattering particles, these surface irregularities can be controlled to provide predetermined theoretically predicted and experimentally selected variations of the field intensity and configuration properties of purely imaging screens.

Practical embodiments of the above discussed concepts will now be described.

Practical Embodiments

The outer layer S is in a practical embodiment, a roll coating consisting of one part thinning medium consisting of equal parts of toluol and isopropylacetate added to four parts of an acrylic compound made up of nitrocellulose and the copolymer known as butyl methacrylate. The proportion is approximately 35 parts by weight of the resinous materials to 4 parts of nitrocellulose, sufficiently nitrated and of low viscosity for lacquer formation. To each five gallons of this mixture are added approximately 23 ounces of the material available under the trade designation "Aerosil" for Godfrey L. Cabot Inc., of Boston, Mass., which material consists essentially of colloidal silica of a grain size of approximately .015 to .020 micron.

It appears that these colloidal particles occur in aggregates of an average size of about a thousand millimicrons, in keeping with the above outlined scattering function thereof. This roll coating is approximately 5 mils thick and is applied with a conventional surface roll-coating machine with a glue-line separation of any desired thickness, in a specific embodiment about .003 inch.

The metal layer 2 can comprise any highly light-reflecting specular metal, and in the embodiment of FIG. 8 it comprises a plating of highly specular metal such as silver or aluminum applied directly to a plastic sheet 3 in any known way. For example, the metal can be applied through a vacuum plating process wherein the plastic material is degassed to the necessary degree and then exposed to a metal vapor to provide a thin metallic coating of uniform thickness.

The plastic sheet 3 is a synthetic thermoplastic material which is nonreactive and inert with respect to the metallic layer 2 even when heated to temperatures approaching its flow temperature. Otherwise, when the product is heated to molding temperatures there is a serious tendency for the plastic material to separate from the metallic layer, and for the metallic layer to deteriorate and completely lose its highly light-reflective, non-absorptive characteristics. Thus, it is essential that the plastic material contain virtually no acids, water or water vapor, sulphur, or other deleterious substances which are found in many synthetic plastic materials and which are particularly deteriorating when the product is headed as for molding purposes.

A backing layer 5 is preferably made of strong cloth such as cotton or nylon fabric with 64/62 thread, impregnated with a suitable fire and fungus resistant material and joined to sheet 3 with a vinyl adhesive 4.

In another embodiment the plastic sheet 3 may be glued to the metallic layer 2 by means of a suitable adhesive which is inert with respect thereto. Such an adhesive can comprise, for example, acrylic, vinyl, rubber, cellulose nitrate or cellulose acetate adhesives.

Still another method, preferable in many instances, is to first emboss plastic sheet 3, then plate the embossed sheet, then roll-coat the plated embossed sheet.

If instead of the front coating containing scatter particles, a front coating with surface scatter effect is used, the following technique of applying such a coating was found to be practical, replacing the roll coated front layer described above with reference to FIG. 8. The sheet 3 carrying the metal layer 2 is sprayed with a compound available under the trade designation "L/471" from the Union Paste Company of Hyde Park, Mass., which compound as mentioned above, consists of 4 parts by weight of nitrocellulose and 35 parts of the copolymer known as butyl methacrylate of the type "Polycryl 419" made by American Polymer Corp. The nitrocellulose should be sufficiently nitrated and of low viscosity for lacquer formulation. The solvent used for obtaining a compound suitable for spraying consists of about equal parts lacquer grade toluol and isopropyl acetate. This spray dries with a surface pattern that has an optical effect corresponding to that described above with reference to FIG. 6. In order to obtain the size and distribution necessary for a predetermined modification of the field properties of the purely image forming elements, variations of viscosity, temperature, composition and drying speed may be necessary, as customary in techniques of this type.

It is also contemplated to first emboss a plastic sheet 3 having a matte surface to provide the desired scatter effect, then plate the embossed matte surface, and apply a thin optically essentially clear protective layer over the plating.

FIG. 9 is the above mentioned polar coordinate diagram which illustrates the lateral performance of screens of the present type in comparison with conventional screens. In this figure, numeral XI indicates the performance of a fully specular screen of the above described configuration. XII indicates the performance of a diffusion controlled screen according to the present invention, XIII that of a conventional glass beaded screen such as used for purposes of visual education in class rooms, and XIV that of a so-called "Daylight Screen" having a thin flat coating of aluminum on a cardboard backing, with a protective acrylic spray coating on the front surfaces. The brilliance is plotted in foot-Lambert for the respective angles. The field angle 20 of the screen XI is 80°. Screen XII provides a field of substantially unimpaired brilliance over about 60°, and a completely usable field for average purposes over about 80°. Screen XII also provides, beyond its usable field corresponding to the field of screen XI, an extended field of fairly uniformly decreasing brilliance up to approximately 180°. It will be noted that $d=40°$ is the basis of the preceding computations for a screen according to FIGS. 2 to 5. Beyond the predetermined field of observation, screen XI has a narrow zone of increased brilliance which is due to image fusion. Screen XI is wholly unaffected by ambient light sources outside the field of observation. Screen XIV is more brilliant at the central region, but non-uniform. If screens XI and XII were designed for a smaller total field angle or usable field of say 30°, their brilliance would be at least equal to that of Screen XIV, and would be uniform throughout such field.

Generally speaking, screens of types XI and XII transmit an optimal amount of energy from the projector to the observer, they permit accurate control of the field of observation, they have optimal color characteristics due to freedom of choice of the reflective metal, they have improved resolving power, they have uniform field illumination, they exclude ambient light from the field of observation, and they have increased brightness near the field borders which counteracts ambient light.

Furthermore, experience has shown that screens according to the invention have imaging and scatter angles which are very favorable with regard to polarization phenomena so that the screens are fully non-polarizing.

We claim:

1. An optical screen for presenting to a given field of observation the image of an object region projected on the screen, comprising:

a reflecting surface essentially composed of elementary imaging mirror means having optically imaging curvatures arranged in a regular pattern, with the margins of said elementary mirrors contiguously connected such as substantially to reduce dull light absorbing areas and flat non-imaging areas, to form elementary imaging mirrors together providing a highly directional projection screen of predetermined optical field properties including uniform distribution over and concentration on the field of the energy available from the object, and said elementary imaging mirrors being of dimensions smaller than can be resolved upon observation by the average viewer at a given viewing distance; and applied to said reflecting surface an essentially transparent layer containing embedded therein essentially randomly distributed and essentially separated non-metallic randomly light scattering elements of dimensions of an order of magnitude slightly larger than the longest wavelength of the visible spectrum including the infrared spectrum, and of an index of refraction different from that of said layer;

whereby said scattering elements contribute to the control of said field of observation of the reflecting surface as defined by the imaging mirror means.

2. Optical screen according to claim 1 wherein said transparent layer is of essentially uniform thickness.

3. Optical screen according to claim 1 wherein the density and distribution of said imbedded particles is such that the transparency of said layer is essentially preserved so as not to impair the reflective effect of said reflecting surface.

4. Optical screen according to claim 3 wherein the weight of said particles is less than approximately five percent of the weight of the transparent layer.

5. Optical screen according to claim 4 wherein said layer is essentially a resinous compound and said particles consist essentially of colloidal silica.

6. Optical screen according to claim 5 wherein said layer is approximately five thousands of an inch thick.

7. Optical screen according to claim 5 wherein said colloidal silica particles occur in aggregates of an average size of about a thousand millimicrons.

8. An optical screen for presenting to a field of observation the image of an object region projected on the screen, comprising: a reflecting surface essentially composed of parallel strips with undulating borders the borders of each strip being symmetric to the axis of said strip, the strips being contiguous at said undulating borders, each strip having transverse curvatures in planes perpendicular to its axis and the surface of each strip undulating along its axis from concave to convex such that said transverse curvatures are larger where the distances between said borders are wider, and smaller where the distances between said borders are narrower, said concave and convex surface having a greater curvature along said axis than the largest transverse curvatures, to form elementary imaging mirrors with a longer and shorter axis at each widest and narrowest portion respectively of each strip, said elementary mirrors together providing a highly directional optical screen of predetermined field properties including uniform energy distribution over the field, and said elementary imaging mirrors being of dimensions smaller than can be resolved upon observation by the average viewer at a given viewing distance; and applied to said surface an essentially transparent layer of substantially uniform thickness containing embedded therein essentially randomly distributed and effectively separate non-metallic randomly light scattering elements of dimensions of an order of magnitude slightly larger than the longest wave length of the visible including infrared spectrum, and of an index of refraction different from that of said layer; whereby said scattering elements contribute to the control of the field of the reflecting surface as defined by said borders and said curvatures.

9. Optical screen according to claim 8, wherein the density and distribution of said imbedded particles is such that the transparency of said layer is essentially preserved so as not to impair the reflective effect of said reflecting surface.

10. Optical screen according to claim 9 wherein the weight of said particles is less than approximately five percent of the weight of the transparent layer.

11. An optical screen for presenting to a given field of observation the image of an object region projected on the screen, comprising:

a reflecting surface essentially composed of elementary imaging mirror means having optically imaging curvatures arranged in a regular pattern, with the margins of said elementary mirrors contiguously connected such as substantially to reduce dull light absorbing areas and flat non-imaging areas, to form elementary imaging mirrors together providing a highly directional projection screen of predetermined optical field properties including uniform distribution over and concentration on the field of the energy available from the object, and said elementary imaging mirrors being of dimensions smaller than can be resolved upon observation by the average viewer at a given viewing distance;

applied to said reflecting surface an essentially transparent layer of essentially uniform thickness; and embedded in said layer essentially randomly distributed and essentially separated non-metallic randomly light scattering particles of colloidal silica averaging a grain size of approximately 0.015 to 0.020 micron and occurring in aggregates of an average size of about 1000 millimicrons, the density of distribution of said particles being determined by adding to an essentially transparent coating material approximately 5 percent by weight of said colloidal silica and by coating said material on said reflecting surface to form said layer to a thickness of approximately 0.005 inch, and the index of said coating material being different from that of said particles;

whereby the transprency of said layer is essentially preserved so as not to impair the imaging effect of said elementary mirror means and said particles contribute to the control of the field of observation of the reflecting surface as defined by the imaging mirror means.

References Cited in the file of this patent

UNITED STATES PATENTS

| | | |
|---|---|---|
| 2,044,620 | Matthai | June 16, 1936 |
| 2,271,614 | Baselt | Feb. 3, 1942 |
| 2,480,031 | Kellogg | Aug. 23, 1949 |
| 2,508,058 | Bradley | May 16, 1950 |
| 2,758,200 | Franck | Aug. 7, 1956 |
| 2,804,801 | Mihalakis | Sept. 3, 1957 |

UNITED STATES PATENT OFFICE
CERTIFICATE OF CORRECTION

Patent No. 3,063,339                         November 13, 1962

Agis I. Mihalakis et al.

It is hereby certified that error appears in the above numbered patent requiring correction and that the said Letters Patent should read as corrected below.

In the grant, lines 3 and 4, for "assignors, by mesne assignments, to William J. Snyder," read -- assignor, by mesne assignments, to William T. Snyder, --; line 13, for "William J. Snyder, his heirs" read -- William T. Snyder, his heirs --; in the heading to the printed specification, line 5, for "assignors, by mesne assignments, to William J. Snyder," read -- assignors, by mesne assignments, to William T. Snyder, --; column 1, line 67, for "jutaposed" read -- juxtaposed --.

Signed and sealed this 30th day of April 1963.

(SEAL)
Attest:
ERNEST W. SWIDER
Attesting Officer

DAVID L. LADD
Commissioner of Patents